US009305231B2

(12) United States Patent
Marrion et al.

(10) Patent No.: US 9,305,231 B2
(45) Date of Patent: Apr. 5, 2016

(54) ASSOCIATING A CODE WITH AN OBJECT

(71) Applicant: Cognex Corporation, Natick, MA (US)

(72) Inventors: Cyril C. Marrion, Acton, MA (US);
James Negro, Arlington, MA (US);
Matthew Engle, Watertown, MA (US)

(73) Assignee: Cognex Corporation, Natick, MA (US)

( * ) Notice: Subject to any disclaimer, the term of this patent is extended or adjusted under 35 U.S.C. 154(b) by 123 days.

(21) Appl. No.: 13/957,413

(22) Filed: Aug. 1, 2013

(65) Prior Publication Data

US 2015/0036876 A1 Feb. 5, 2015

(51) Int. Cl.
*G06K 9/00* (2006.01)
*G06K 9/20* (2006.01)
*G06K 9/32* (2006.01)
*G06T 7/00* (2006.01)
*G06K 7/10* (2006.01)

(52) U.S. Cl.
CPC ............ *G06K 9/2054* (2013.01); *G06K 9/3241* (2013.01); *G06T 7/0042* (2013.01); *G06T 2207/10028* (2013.01); *G06T 2207/30164* (2013.01)

(58) Field of Classification Search
USPC .................. 382/100, 103, 106–108, 112–113, 382/140–143, 154, 168, 173, 181, 193, 199, 382/209, 224, 232, 254, 274, 276, 285–291, 382/305, 312, 318; 235/462.01, 438, 385, 235/462.21
See application file for complete search history.

(56) References Cited

U.S. PATENT DOCUMENTS

| | | | | |
|---|---|---|---|---|
| 7,383,991 | B2 * | 6/2008 | Silverbrook | G06F 3/014 235/385 |
| 8,360,318 | B2 * | 1/2013 | Reynolds | G06K 7/10722 235/462.01 |
| 2006/0043191 | A1 * | 3/2006 | Patel | G06K 7/10722 235/462.21 |
| 2013/0020391 | A1 | 1/2013 | Olmstead et al. | |
| 2014/0029796 | A1 * | 1/2014 | Fiorini | G06K 7/10861 382/103 |
| 2014/0034731 | A1 * | 2/2014 | Gao | G06K 7/015 235/438 |

OTHER PUBLICATIONS

Extended European Search Report for European Patent Application No. 14179423.0, dated Jul. 10, 2015; (6 pages).

* cited by examiner

*Primary Examiner* — Seyed Azarian
(74) *Attorney, Agent, or Firm* — Proskauer Rose (57) ABSTRACT

Described are machine vision systems, methods, and apparatus, including computer program products for associating codes with objects. In an embodiment, a machine vision system includes an area-scan camera having a field of view (FOV), the area-scan camera disposed relative to a first workspace such that the FOV covers at least a portion of the first workspace and a dimensioner disposed relative to a second workspace. The machine vision system includes a machine vision processor configured to: determine an image location of a code in an image; determine a ray in a shared coordinate space that is a back-projection of the image location of the code; determine one or more surfaces of one or more objects based on dimensioning data; determine a first surface of the one or more surfaces that intersects the 3D ray; and associate the code with an object associated with the first surface.

24 Claims, 7 Drawing Sheets

ASSOCIATING A CODE WITH AN OBJECT

FIELD OF THE TECHNOLOGY

The present technology relates generally to machine vision systems and, more specifically, to machine vision systems for associating a code with an object.

BACKGROUND

Machine vision systems that perform measurement, inspection, alignment of objects, optical character recognition, and/or decoding of symbology (e.g. bar codes, two-dimensional codes, alphanumeric, binary, Kanji, Unicode, any other encoding of data, etc.) are used in a wide range of applications and industries. In an example, a code reader can be used to acquire an image of an object that is believed to contain one or more barcodes, two-dimensional codes or other symbol types. The image is processed to identify code features, which are then decoded by a decoding process and/or processor to obtain the alphanumeric data represented by the code. A common application is to track objects (e.g., packages) moving along a line (e.g., a conveyor system) in logistics and shipping operations. Packages have codes (e.g., bar codes, two-dimensional codes, symbols, etc.) applied to them for identification purposes. In some systems, a code reader is positioned adjacent to the conveyor for reading the codes on the packages as they pass by the code reader. To track objects on the conveyor, the system associates codes read by the code reader with packages.

Some existing systems use a laser-scanner or a line-scan camera to read the codes on the objects. However, these systems have shortcomings. Systems using a laser-scanner typically cannot read two dimensional symbols (e.g., two-dimensional codes or text). Systems using a line-scan camera typically have limited depth of focus, requiring additional complexity to adjust the line-scan camera's focus to account for objects of different height.

SUMMARY

The technology described herein overcomes disadvantages of existing systems by providing machine vision systems that use area-scan cameras for reading codes on objects, and associating codes with objects.

In one aspect, there is a machine vision system. The machine vision system can include an area-scan camera having a field of view (FOV), the area-scan camera disposed relative to a first workspace such that the FOV covers at least a portion of the first workspace. The machine vision system can include a dimensioner disposed relative to a second workspace. The machine vision system can include one or more machine vision processors in communication with the area-scan camera and the dimensioner, one or more machine vision processors configured to: receive from the area-scan camera an image of at least a portion of one or more objects in the first workspace; determine an image location of a code in the image; determine a ray in a shared coordinate space that is a back-projection of the image location of the code; receive from the dimensioner dimensioning data associated with the one or more objects in the second workspace; determine one or more surfaces of the one or more objects based on the dimensioning data, coordinates of the one or more surfaces expressed in the shared coordinate space; determine a first surface of the one or more surfaces that intersects the 3D ray; identify an object of the one or more objects that is associated with the first surface; and associate the code with the object.

In some embodiments, the first workspace is the same as second workspace. In some embodiments, the first workspace and the second workspace at least partially intersect. In some embodiments, the first workspace and the second workspace are disjoint. In some embodiments, the system can include a conveyor configured to move the one or more objects through the first workspace and the second workspace. In some embodiments, the dimensioner is a time-of-flight dimensioner. In some embodiments, the one or more machine vision processors are further configured to determine the first surface of the one or more surfaces that intersects the 3D ray by determining a proximal surface of one or more intersecting surfaces intersecting the 3D ray that is closest to the area-scan camera. In some embodiments, the one or more machine vision processors are further configured to: determine dimensions of the object based on the dimensioner data; and provide the code and the dimensions of the object. In some embodiments, the area-scan camera comprises a memory storing one or more calibration transforms. In some embodiments, the area-scan camera comprises a memory storing one or more camera calibration transforms and the one or more machine vision processors are configured to: receive the one or more camera calibration transforms from the memory of the area-scan camera; and determine one or more system calibration transforms based on the one or more camera calibration transforms.

In another aspect, there is a method performed by one or more machine vision processors. The method can include receiving, by the one or more machine vision processors, from an area-scan camera an image of at least a portion of one or more objects in a first workspace. The method can include determining, by the one or more machine vision processors, an image location of a code in the image. The method can include determining, by the one or more machine vision processors, a ray in a shared coordinate space that is a back-projection of the image location of the code in the image. The method can include receiving, by the one or more machine vision processors, from a dimensioner dimensioning data associated with the one or more objects in the second workspace. The method can include determining, by the one or more machine vision processors, one or more surfaces of the one or more objects based on the dimensioning data, the one or more surfaces expressed in the shared coordinate space. The method can include determining, by the one or more machine vision processors, a first surface of the one or more surfaces that intersects the 3D ray. The method can include identifying, by the one or more machine vision processors, an object of the one or more objects that is associated with the first surface. The method can include associating, by the one or more machine vision processors, the code with the object.

In some embodiments, the first workspace is the same as second workspace. In some embodiments, the first workspace and the second workspace at least partially intersect. In some embodiments, the first workspace and the second workspace are disjoint. In some embodiments, determining the first surface of the one or more surfaces that intersects the 3D ray includes determining a proximal surface of one or more intersecting surfaces intersecting the 3D ray that is closest to the area-scan camera. In some embodiments, the method includes determining, by the one or more machine vision processors, dimensions of the object based on the dimensioner data. In some embodiments, the method includes providing, by the one or more machine vision processors, the code and the dimensions of the object. In some embodiments, the area-scan camera comprises a memory storing one or more calibration transforms. In some embodiments, the area-scan camera comprises a memory storing one or more camera calibration transforms and the method further includes: receiving, by the one or more machine vision processors, the one or more camera calibration transforms from the memory of the area-scan camera; and determining, by the one or more machine vision processors, one or more system calibration transforms based on the one or more camera calibration transforms.

In another aspect, there is a computer program product, tangibly embodied in a non-transitory computer readable storage medium, including instructions being operable to cause one or more machine vision processors to: receive from an area-scan camera an image of at least a portion of one or more objects in a first workspace; determine an image location of a code in the image; determine a ray in a shared coordinate space that is a back-projection of the image location of the code in the image; receive from a dimensioner dimensioning data associated with the one or more objects in the second workspace; determine one or more surfaces of the one or more objects based on the dimensioning data, the one or more surfaces expressed in the shared coordinate space; determine a first surface of the one or more surfaces that intersects the 3D ray; identify an object of the one or more objects that is associated with the first surface; and associate the code with the object.

In some embodiments, the first workspace is the same as second workspace. In some embodiments, the first workspace and the second workspace at least partially intersect. In some embodiments, the first workspace and the second workspace are disjoint. In some embodiments, the instructions being operable to cause the one or more machine vision processors to determine the first surface of the one or more surfaces that intersects the 3D ray include instructions to determine a proximal surface of one or more intersecting surfaces intersecting the 3D ray that is closest to the area-scan camera. In some embodiments, the computer program product includes instructions being operable to cause the one or more machine vision processors to determine dimensions of the object based on the dimensioner data; and provide the code and the dimensions of the object. In some embodiments, the area-scan camera comprises a memory storing one or more calibration transforms. In some embodiments, the area-scan camera comprises a memory storing one or more camera calibration transforms and the computer program product includes instructions being operable to cause the one or more machine vision processors to: receive the one or more camera calibration transforms from the memory of the area-scan camera; and determine one or more system calibration transforms based on the one or more camera calibration transforms.

In another aspect, there is a machine vision system. The machine vision system can include an area-scan camera having a field of view (FOV), the area-scan camera disposed relative to a first workspace such that the FOV covers at least a portion of the first workspace. The machine vision system can include a dimensioner disposed relative to a second workspace. The machine vision system can include one or more machine vision processors in communication with the area-scan camera and the dimensioner, the one or more machine vision processors configured to: receive from the area-scan camera an image of at least a portion of one or more objects in the first workspace; determine one or more image locations associated with a code in the image; determine one or more rays in a shared coordinate space that are back-projections of the one or more image locations associated with the code; receive from the dimensioner dimensioning data associated with the one or more objects in the second workspace; determine one or more surfaces of the one or more objects based on the dimensioning data, coordinates of the one or more surfaces expressed in the shared coordinate space; determine one or more candidate surfaces of the one or more surfaces, wherein each candidate surface is within a threshold distance from at least one of the one or more rays; select a first surface of the one or more candidate surfaces based on one or more surface selection criteria; identify an object of the one or more objects that is associated with the first surface; and associate the code with the object.

In some embodiments, the first workspace is the same as second workspace. In some embodiments, the first workspace and the second workspace at least partially intersect. In some embodiments, the first workspace and the second workspace are disjoint. In some embodiments, the system can include a conveyor configured to move the one or more objects through the first workspace and the second workspace. In some embodiments, the dimensioner is a time-of-flight dimensioner. In some embodiments, the one or more machine vision processors are further configured to: determine dimensions of the object based on the dimensioner data; and provide the code and the dimensions of the object. In some embodiments, the area-scan camera comprises a memory storing one or more calibration transforms. In some embodiments, the area-scan camera comprises a memory storing one or more camera calibration transforms and the one or more machine vision processors are configured to: receive the one or more camera calibration transforms from the memory of the area-scan camera; and determine one or more system calibration transforms based on the one or more camera calibration transforms.

In another aspect, there is a method performed by one or more machine vision processors. The method can include receiving, by the one or more machine vision processors, from an area-scan camera an image of at least a portion of one or more objects in a first workspace. The method can include determining, by the one or more machine vision processors, one or more image locations associated with a code in the image. The method can include determining, by the one or more machine vision processors, one or more rays in a shared coordinate space that are back-projections of the one or more image locations associated with the code. The method can include receiving, by the one or more machine vision processors, from a dimensioner dimensioning data associated with the one or more objects in a second workspace. The method can include determining, by the one or more machine vision processors, one or more surfaces of the one or more objects based on the dimensioning data, coordinates of the one or more surfaces expressed in the shared coordinate space. The method can include determining, by the one or more machine vision processors, one or more candidate surfaces of the one or more surfaces, wherein each candidate surface is within a threshold distance from at least one of the one or more rays. The method can include selecting, by the one or more machine vision processors, a first surface of the one or more candidate surfaces based on one or more surface selection criteria. The method can include identifying, by the one or more machine vision processors, an object of the one or more objects that is associated with the first surface. The method can include associating, by the one or more machine vision processors, the code with the object.

In some embodiments, the first workspace is the same as second workspace. In some embodiments, the first workspace and the second workspace at least partially intersect. In some embodiments, the first workspace and the second workspace are disjoint. In some embodiments, the method includes determining, by the one or more machine vision processors, dimensions of the object based on the dimensioner data. In some embodiments, the method includes providing, by the one or more machine vision processors, the code and the dimensions of the object. In some embodiments, the area-scan camera comprises a memory storing one or more calibration transforms. In some embodiments, the area-scan camera comprises a memory storing one or more camera calibration transforms and the method further includes: receiving, by the one or more machine vision processors, the one or more camera calibration transforms from the memory of the area-scan camera; and determining, by the one or more machine vision processors, one or more system calibration transforms based on the one or more camera calibration transforms.

In another aspect, there is a computer program product, tangibly embodied in a non-transitory computer readable storage medium, including instructions being operable to cause one or more machine vision processors to: receive from an area-scan camera an image of at least a portion of one or more objects in a first workspace; determine one or more image locations associated with a code in the image; determine one or more rays in a shared coordinate space that are back-projections of the one or more image locations associated with the code; receive from a dimensioner dimensioning data associated with the one or more objects in a second workspace; determine one or more surfaces of the one or more objects based on the dimensioning data, coordinates of the one or more surfaces expressed in the shared coordinate space; determine one or more candidate surfaces of the one or more surfaces, wherein each candidate surface is within a threshold distance from at least one of the one or more rays; select a first surface of the one or more candidate surfaces based on one or more surface selection criteria; identify an object of the one or more objects that is associated with the first surface; and associate the code with the object.

In some embodiments, the first workspace is the same as second workspace. In some embodiments, the first workspace and the second workspace at least partially intersect. In some embodiments, the first workspace and the second workspace are disjoint. In some embodiments, the computer program product includes instructions being operable to cause the one or more machine vision processors to determine dimensions of the object based on the dimensioner data; and provide the code and the dimensions of the object. In some embodiments, the area-scan camera comprises a memory storing one or more calibration transforms. In some embodiments, the area-scan camera comprises a memory storing one or more camera calibration transforms and the computer program product includes instructions being operable to cause the one or more machine vision processors to: receive the one or more camera calibration transforms from the memory of the area-scan camera; and determine one or more system calibration transforms based on the one or more camera calibration transforms.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides machine vision systems and machine vision processes for reading codes on objects and associating the codes with objects. In an exemplary application of the technology, a machine vision system is provided with an area-scan camera and a dimensioner disposed adjacent to a conveyor belt of a conveyor system, such that the area-scan camera can capture images of objects on the conveyor belt and the dimensioner can determine the dimensions and pose of objects on the conveyor belt. The machine vision system can use the area-scan camera to read codes on the objects as they pass by the camera. The machine vision system can use data from the dimensioner (e.g., dimensioning data including object dimensions and object pose information) to determine to which objects the identified codes are affixed and associate codes with objects. For example, the machine vision system can determine the location of a code in an image captured by the area-scan camera and determine a ray in the coordinate space of the conveyor system that is a back-projection of the image location of the code from the image coordinate space to the conveyor coordinate space. The machine vision system can then use the dimensioning data that has been specified in or has been mapped to the coordinate space of the conveyor system to identify the surface of an object to which the code is attached by finding the object surface closest to the camera that intersects the ray. Based on the identified surface, the machine vision system can associate the code with the object.

I. Machine Vision Systems

Figure 1A:
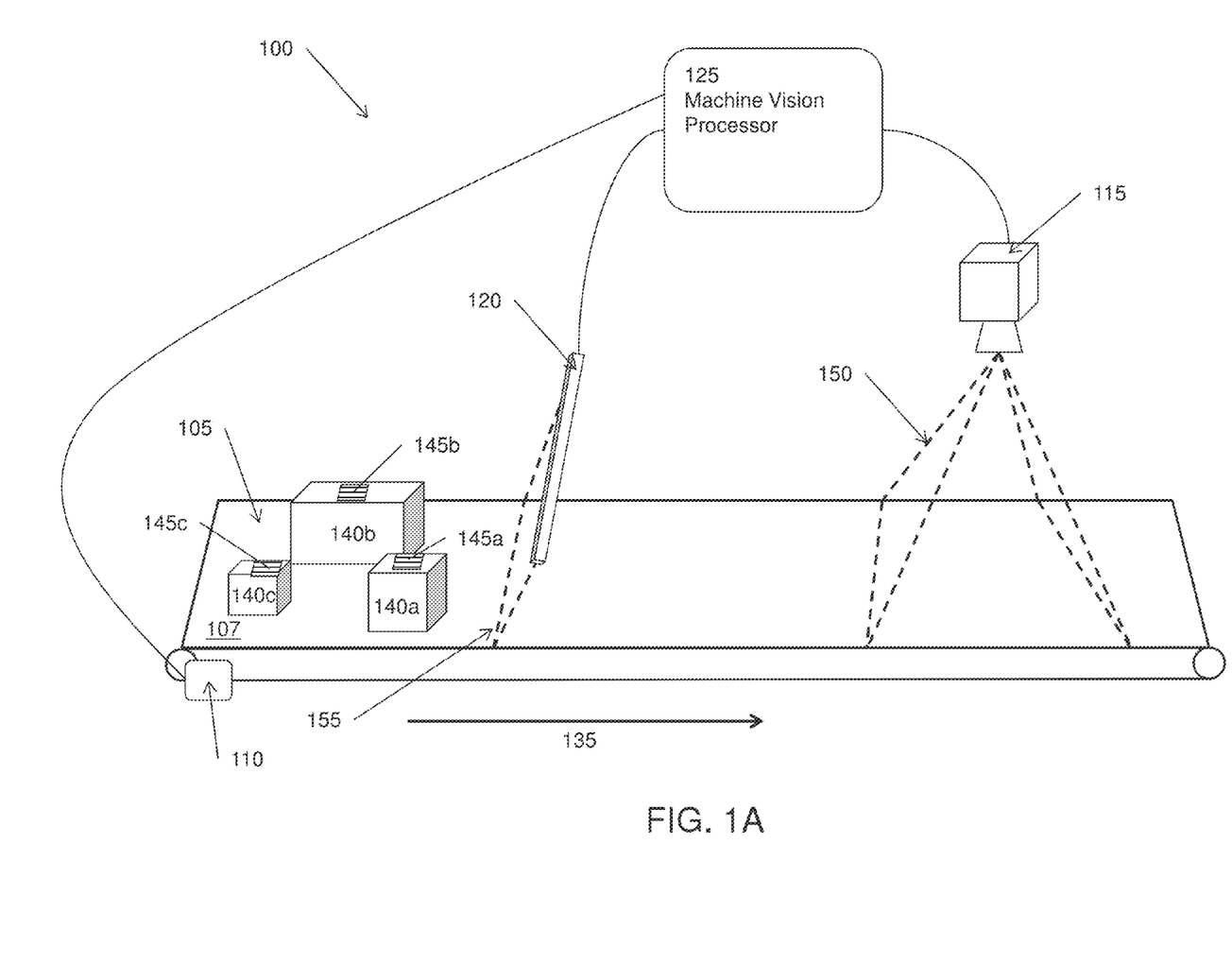
FIGS. 1A-1C depict a machine vision system in accordance with the technology.
Figure 1B:
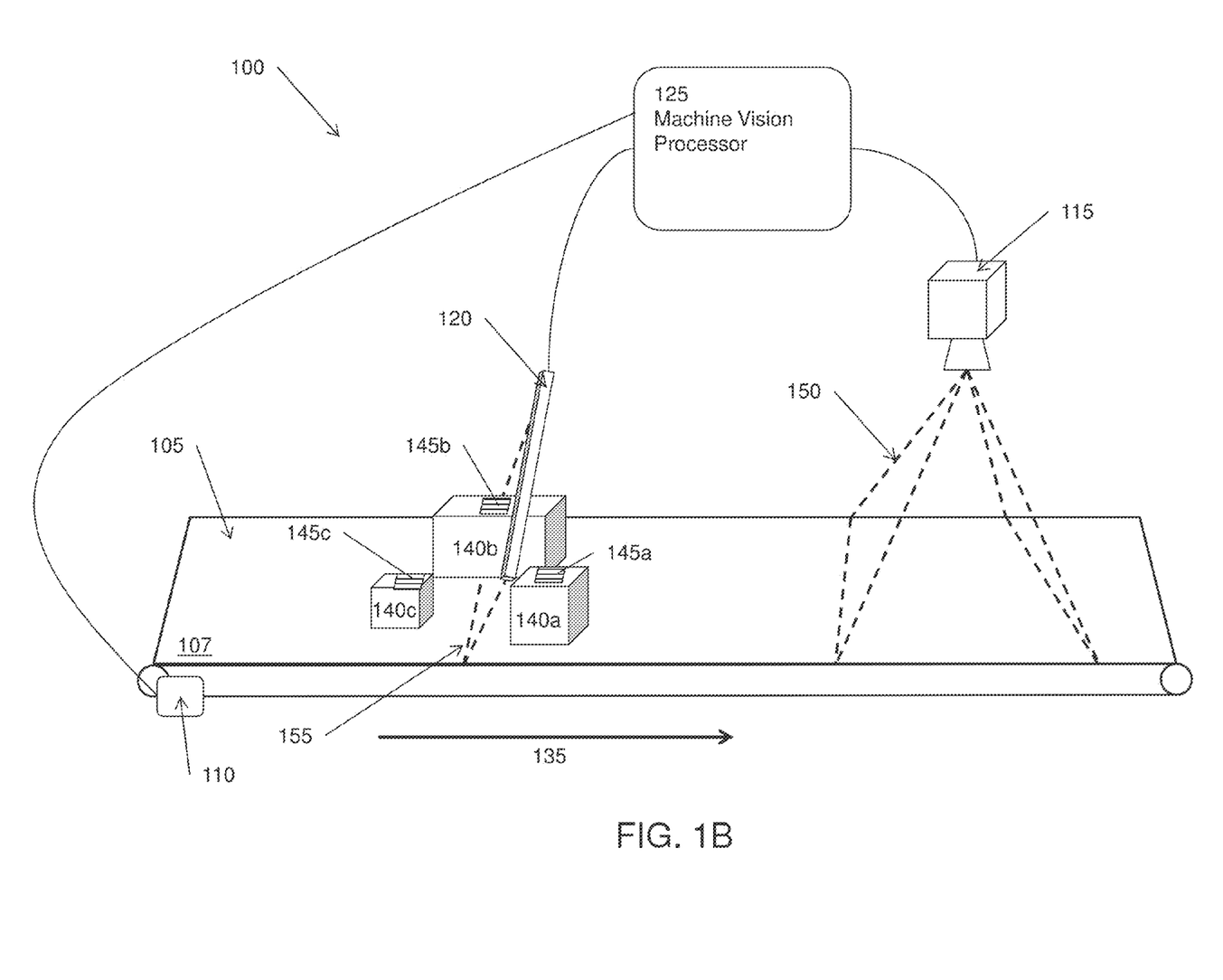
Figure 1C:
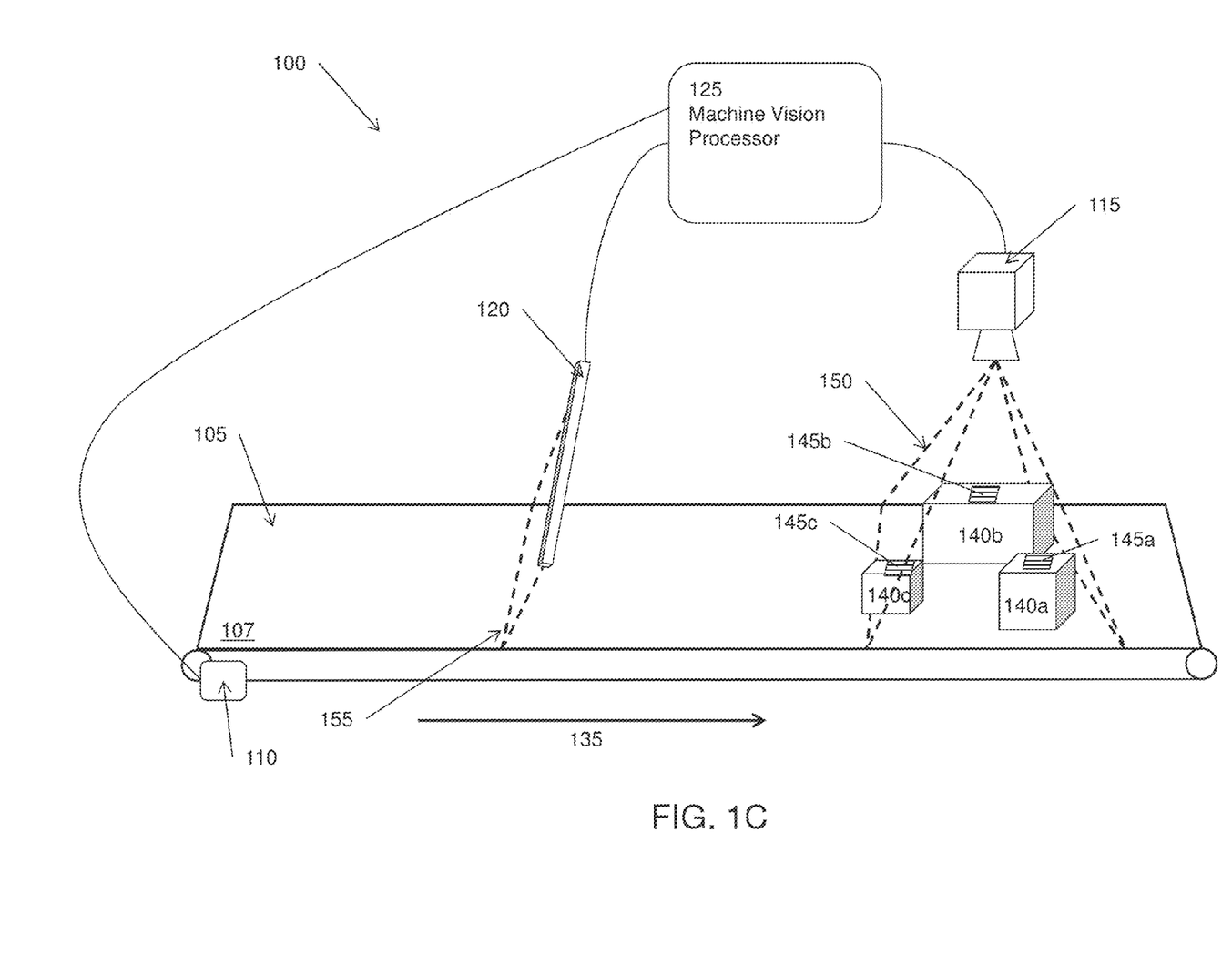

Referring now to the drawings, exemplary embodiments of the technology will be described. FIGS. 1A-1C depict machine vision system 100 in accordance with the technology. System 100 includes conveyor system 105, including conveyor belt 107 and position encoder 110, a two-dimensional area-scan camera 115, a dimensioner 120, and a machine vision processor 125. Conveyor system 105 is configured to convey parts along the length of conveyor system 105 in the direction of arrow 135. As illustrated, exemplary objects 140a, 140b, and 140c (collectively objects 140) are on conveyor belt 107 of conveyor system 105. In the illustrated embodiment, objects 140 might not be singulated (e.g., object's positions on conveyer belt 107 along the direction of arrow 135 can overlap). Objects 140a, 140b, and 140c are labeled with codes 145a, 145b, and 145c, respectively (collectively codes 145). Codes 145 can be barcodes, 2D codes, alphanumeric characters, other any other symbol types.

As described above, conveyor system 105 is configured to convey parts along the length of conveyor system 105 in the direction of arrow 135. Position encoder 110 (e.g., a tachometer) can be connected to conveyor system 105 to generate an encoder pulse count that can be used to identify the position of conveyor belt 107 along the direction of arrow 135. Position encoder 110 can provide the encoder pulse count to machine vision processor 125 for machine vision processing as will be described in greater detail below. The encoder pulse count can be used to identify and track the positions of objects on conveyor belt 107 (e.g., object 140). In operation, position encoder 110 can increment an encoder pulse count each time conveyor belt 107 moves a pre-determined distance (encoder pulse count distance) in the direction of arrow 135. An object's position along conveyer belt 107 can be determined based on its initial position, the change in the encoder pulse count, and the encoder pulse count distance.

In the illustrated embodiment, area-scan camera 115 can be an area-scan camera including a two-dimensional CCD camera sensor, a two-dimensional CMOS camera sensor or any other type of camera sensor for generating images of codes on objects for decoding purposes. For example, camera 115 can generate images of one or more of codes 140 for purposes of decoding one or more of codes 140. Camera 115 can have field of view 150. Camera 115 can generate two-dimensional images of field of view 150, including objects within field of view 150. Camera 115 can provide the two-dimensional images to machine vision processor 125 for machine vision processing, as will be described in greater detail below. In operation, conveyor system 105 can convey objects (e.g., objects 140) in the direction of arrow 135 such that the objects are moved through field of view 150. In some embodiments, camera 115 can be disposed such that the field of view 150 extends at least a width (e.g., normal to arrow 135) sufficient to capture the top surfaces of objects 140. In some embodiments, camera 115 can be disposed such that the field of view 150 extends at least a length along conveyor system 105, where the length is sufficient to permit camera 115 to capture an image of complete codes (e.g., field of view can have a length at least as long as the longest length of an expected code).

In some embodiments, camera 115 can be a vision system camera as described in commonly assigned U.S. patent application Ser. No. 13/645,173, entitled SYMBOLOGY READER WITH MULTI-CORE PROCESSOR, by Nunnink et al., the entire contents of which are hereby incorporated by reference. In some embodiments, camera 115 can be a DataMan reader produced by Cognex Corporation of Natick, Mass. In some embodiments, camera 115 can include a Field of View Expander (FOVE) as described in commonly assigned U.S. patent application Ser. No. 13/645,241, entitled SYSTEM AND METHOD FOR EXPANSION OF FIELD OF VIEW IN A VISION SYSTEM, by Nunnink et al., the entire contents of which are hereby incorporated by reference. In some embodiments, system 100 can include one or more cameras. For example, cameras can be positioned to capture images of different parts of objects (top, sides, front, back, etc.) such that codes can be read on multiple surfaces of the object.

In the illustrated embodiment, dimensioner 120 can be a light curtain dimensioner for generating dimensioning data. For example, dimensioner 120 can generate dimensioning data (e.g., a point cloud or heights of points on objects 140 above conveyor belt 107, along with pose information) for objects 140. In some embodiments, dimensioners can produce dimensioning data (or object pose data) including but not limited to the 3D pose of cuboids, the 3D pose of surfaces of objects, and/or a 3D point cloud representation of an object and or its surfaces. Dimensioner 120 can generate dimensioning data for objects passing across dimensioner scan line 155. Dimensioner 120 can provide dimensioning data to machine processor 125 for machine vision processing, as will be described in greater detail below. In operation, conveyor system 105 can convey objects (e.g., objects 140) in the direction of arrow 135 such that the objects are passed across dimensioner scan line 155. In some embodiments, dimensioner 120 can be disposed such that the dimensioner scan line 155 extends at least a width (e.g., normal to arrow 135) of conveyor system 105. In some embodiments, dimensioner 120 can be a time-of-flight dimensioner. In some embodiments, dimensioner 120 can be a dimensioner (e.g., CSN950 dimensioner) produced by Mettler Toledo of Columbus, Ohio.

In the illustrated embodiment, machine vision processor 125 can be any processing device (e.g., embedded machine vision processor, computing device, etc.). Machine vision processor 125 can receive data from position encoder 110 (e.g., encoder pulse count data), area-scan camera 115 (e.g., image data), and dimensioner 155 (e.g., dimensioning data) and perform machine vision processing on the data, as will be described in greater detail below. For example, in some embodiments, machine vision processor 125 can detect codes in image data and associate the codes with objects (e.g., determine to which object a code is affixed). In some embodiments, machine vision processor 125 can be and/or be a part of a standalone computing device. In some embodiments, machine vision processor 125 can be a part of camera 115, e.g., as described in U.S. patent application Ser. No. 13/645, 173. In some embodiments, machine vision processor 125 can be a part of dimensioner 120 (e.g., as an embedded processor). More generally, machine vision processor 125 can be any processor or set of processors programmed to perform machine vision processing as described below.

As illustrated in FIGS. 1A-1C, objects 140 can be conveyed along the direction of arrow 135. FIG. 1A illustrates objects 140 at first positions along conveyor belt 107. FIG. 1B depicts objects 140 at second positions along conveyor belt 107, having been conveyed from the first positions along the direction of arrow 135. The positions of objects 140, as shown in FIG. 1B, can be determined based on the first sensed positions of objects 140, the change in the encoder pulse count since objects 140 were at the first positions, and the encoder pulse count distance.

As illustrated in FIG. 1B, object 140*b* is passing dimensioner scan line 155 of dimensioner 120. In some embodiments, dimensioner 120 can determine the height of points on objects (e.g., object 140*b*) along dimensioner scan line 155. By combining the data obtained for each scan of dimensioner scan line 155 while, e.g., object 140*b* passes dimensioner scan line 155 of dimensioner 120, height information about the surfaces of object 140*b* can be determined. Additionally, dimensioner 120 (or machine vision processor 125) can determine the pose of object 140*b* and/or the pose of one or more of the surfaces of object 140*b* in the coordinate space of dimensioner 120 based on the data obtained for each scan of dimensioner scan line, the encoder pulse count, and the encoder pulse count distance. For example, dimensioner 120 can create a three-dimensional representation of object 140*b* and determine the object's location on conveyor belt 107 based on the encoder pulse count and the encoder pulse count distance.

With reference to FIG. 1C, FIG. 1C depicts objects 140 at third positions along conveyor belt 107, having been conveyed from the second positions along the direction of arrow 135. As illustrated in FIG. 1C, objects 140 are passing through field of view 150 of camera 115 and, based on the encoder pulse count and the encoder pulse count distance, the location on conveyor belt 107 being imaged can be determined. Camera 115 can capture images of one or more of codes 140 on objects 140. Additionally, camera 115 (or machine vision processor 125) can determine the locations of the one or more codes 140 in the image coordinate space of camera 115.

In some embodiments, it is contemplated that machine vision system 100 is calibrated. As will be described in greater detail below, system 100 can be calibrated to permit transformation of coordinates between the image coordinate space of camera 115 and the coordinate space of dimensioner 120. For example, calibration can permit transformation of coordinates from the coordinate space of dimensioner 120 to a shared coordinate space (e.g., the coordinate space of conveyor system 105). Calibration can permit transformation of coordinates from the image coordinate space of camera 115 to a shared coordinate space (e.g., the coordinate space of conveyor system 105). Utilizing the calibration and encoder data (e.g., encoder pulse count) collected when the dimensioning data and image data are acquired, machine vision processor 125 can perform machine vision processes relating the image data from camera 115 and the dimensioning data (e.g., object dimensions and pose) from dimensioner 120, thereby allowing machine vision processor 125 to correlate locations in the image coordinate space of camera 115 with coordinates in the coordinate space of dimensioner 120. As another example, calibration can allow machine vision processor 125 to transform dimensioning data (e.g., object dimensions and pose) captured by dimensioner 155 to real-world locations relative to conveyor system 105. Calibration can allow machine vision processor 125 to transform image locations within an image captured by camera 115 to real-world locations relative to conveyor system 105.

In some embodiments, the shared coordinate space is a coordinate space in which spatial and/or temporal differences between when and/or where the dimensioner acquires dimensioning data and when and/or where the camera acquires an image are accounted for and/or corrected for. For example, the transformation of coordinates from the coordinate space of the dimensioner to the shared coordinate space and the transformation of coordinates from the image coordinate space of the camera to the shared coordinate space account for spatial and/or temporal differences between when and/or where the dimensioner acquires dimensioning data and when and/or where the camera acquires an image. Beneficially, such transformations can permit performing machine vision processing on dimensioning data acquired for an object and image data acquired for the same object, where the dimensioning data and image data are captured at different locations and/or times. With reference to FIGS. 1A-1C, for example, the transformation of coordinates from the coordinate space of dimensioner 120 to the shared coordinate space and the transformation of coordinates from the image coordinate space of camera 115 to the shared coordinate space account for dimensioner 120 and camera 115, as illustrated, being spatially separated and acquiring dimensioning data of an object (e.g., object 140*b*) and images of the same object (e.g., object 140*b*) at different locations and/or times.

The illustrated embodiment is merely an exemplary machine vision system configuration. In some embodiments, the machine vision system can be arranged such that objects are conveyed through the area-scan camera's field of view before being conveyed past the dimensioner. In some embodiments, the area-scan camera's field of view and the dimensioner scan line overlap. More generally, the area-scan camera and the dimensioner can be placed in any sequence and can be separated by any distance.

II. Machine Vision Processing

Figure 2A:
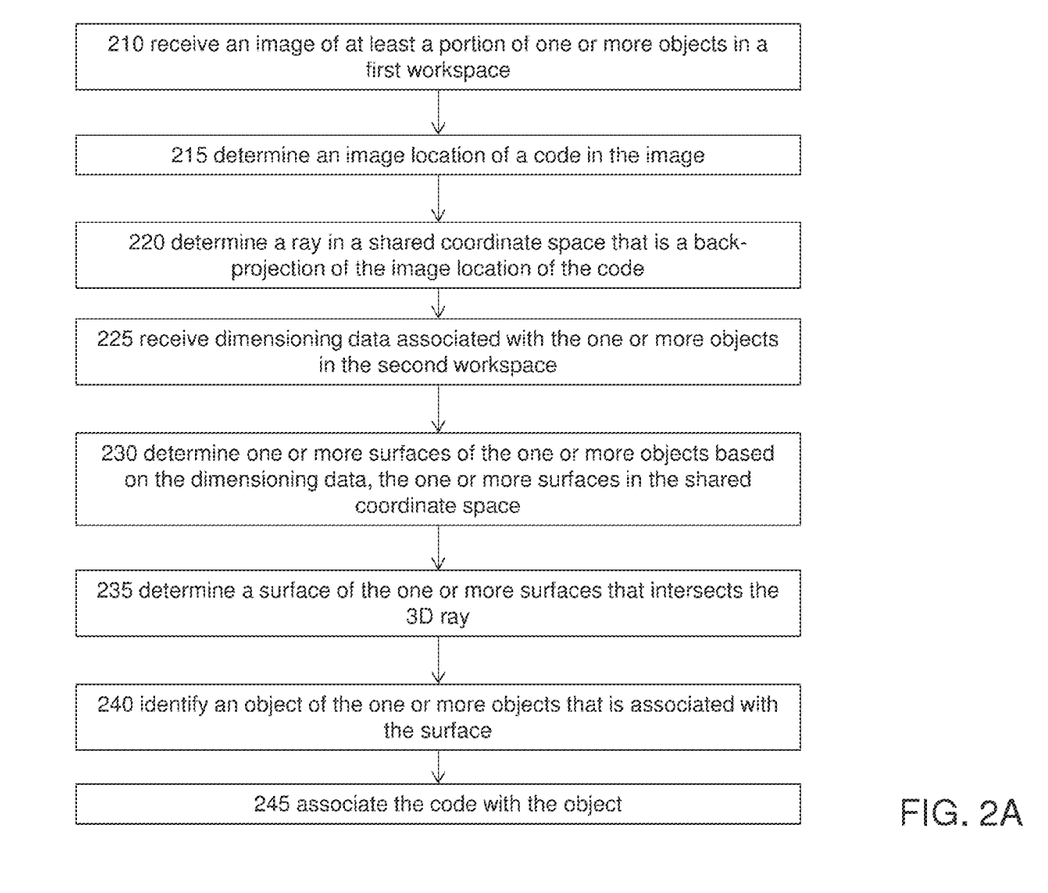
FIG. 2A is a flow chart depicting a machine vision process for associating a code with an object in accordance with the technology.
Figure 3:
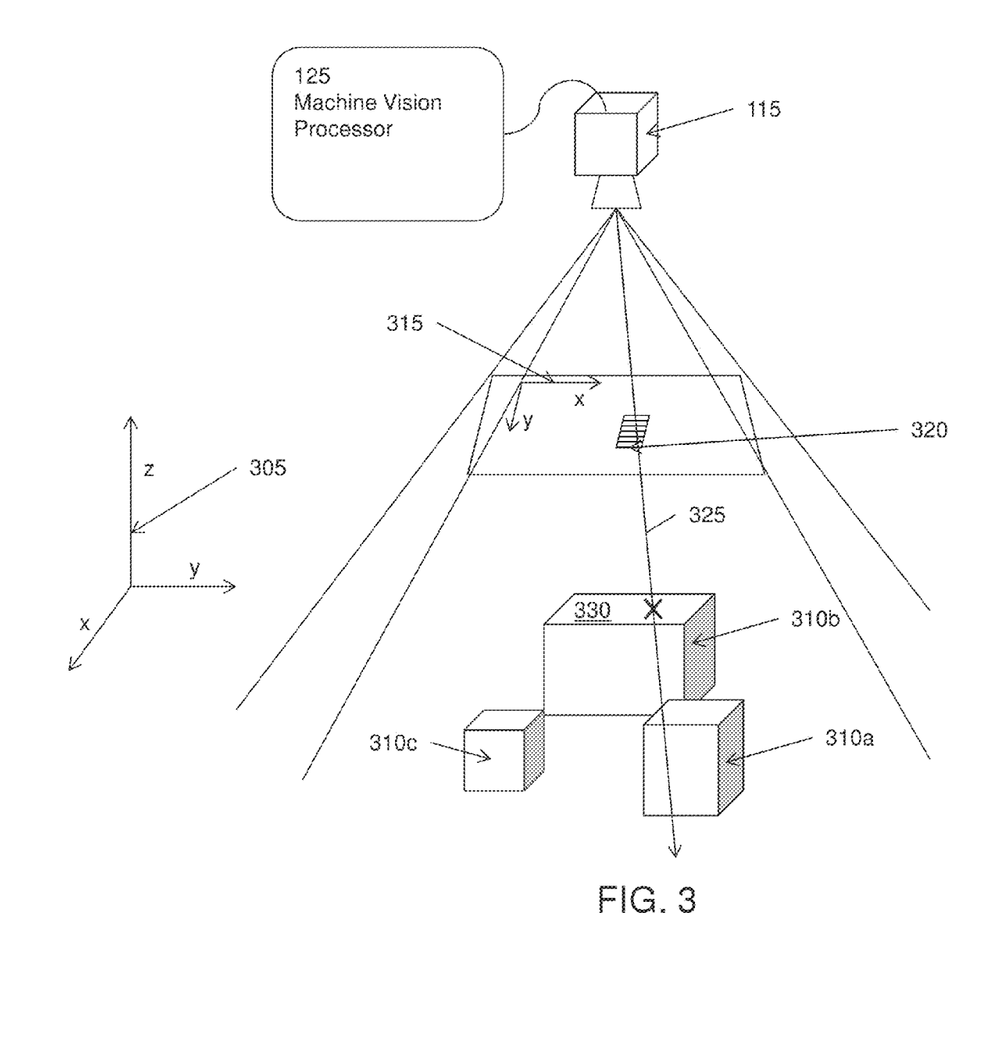
FIG. 3 graphically illustrates the machine vision process depicted in FIG. 2A.

Machine vision processor 125 can be programmed to perform various machine vision processing. FIG. 2A is a flow chart depicting a machine vision process for associating a code with an object in accordance with the technology. FIG. 3 graphically illustrates the machine vision process depicted in FIG. 2A. FIG. 3 depicts a shared coordinate space 305. Shape 310*a* graphically represents dimensioning data (e.g., dimensioning data from dimensioner 120) associated with a first object (e.g., object 140*a*) transformed into shared coordinate space 305; shape 310*b* graphically represents dimensioning data associated with a second object (e.g., object 140*b*) transformed into shared coordinate space 305; and shape 310*c* graphically represents dimensioning data associated with a third object (e.g., object 140*c*) transformed into shared coordinate space 305. In FIG. 3, camera 2D coordinate space 315 is shown containing a code 320 (e.g., image data from camera 115).

Returning to FIG. 2A, at step 210, the machine vision processor receives an image of at least a portion of one or more objects in a first workspace. For example, machine vision processor 125 can receive an image from camera 115. At step 215, the machine vision processor determines an image location of a code in the image. For example, machine vision processor 125 can determine the location of code 320 in camera 2D coordinate space 315. The location of code 320 can be, for example, the coordinates in the image coordinate space of a center of code 320. In some embodiments, the location of code 320 can be the coordinates in the image coordinate space of one or more corners of code 320. The location of code 320 can be found, for example, using the CVL® software made by Cognex Corporation of Natick, Mass. At step 220, the machine vision processor determines a ray in a shared coordinate space that is a back-projection of the image location of the code. For example, machine vision processor 125 can calculate ray 325, as illustrated in FIG. 3, which is a back-projection of the image location of the code 320 in shared coordinate space 305. At step 230, the machine vision processor receives dimensioning data associated with the one or more objects in the second workspace. For example, machine vision processor 125 can receive dimensioning data from dimensioner 120 specifying the dimensions and poses of object 140*a*, 140*b*, and 140*c* in the coordinate space of dimensioner 120.

At step 230, the machine vision system can determine one or more surfaces of the one or more objects based on the dimensioning data, the one or more surfaces in the shared coordinate space. In some embodiments, the surface can be expressed as a set of coordinates in the shared coordinate space, such as coordinates of sample points on the surfaces, coordinates of polygons, coordinates of surface planes, etc. For example, machine vision processor 125 can determine one or more surfaces of objects 140*a*, 140*b*, and 140*c* in shared coordinate space 305 (illustrated as shapes 310*a*, 310*b*, and 310*c*, respectively, in FIG. 3). In some embodiments, surfaces in the coordinate space of dimensioner 120 can be determined from the dimensioning data. A motion vector in shared coordinate space 305 can be calculated representing how objects on the conveyor belt moved between the time when the code was read and when the dimensioning occurred. For example, the motion vector can be calculated based on the change in the encoder count between when the code was read and when the dimensioning occurred and the encoder pulse count distance. The motion vector can be applied to the surfaces to express the surfaces in shared coordinate space 305.

At step 235, the machine vision processor can determine a surface of the one or more surfaces that intersects the 3D ray. For example, machine vision processor 125 can determine that surface 330 intersects ray 325 (illustrated as an 'x' on surface 330). In some embodiments, if more than one surface intersects the ray, the surface closest to the camera that intersects the ray is used. At step 240, the machine vision process identifies an object of the one or more objects that is associated with the surface. For example, machine vision processor 125 can identify object 140*b* as associated with surface 330. At step 245, the machine vision processor associates the code with the object. For example, machine vision processor 125 can associate object 140*b* with code 320 (or the decoded data represented by code 320).

Figure 2B:
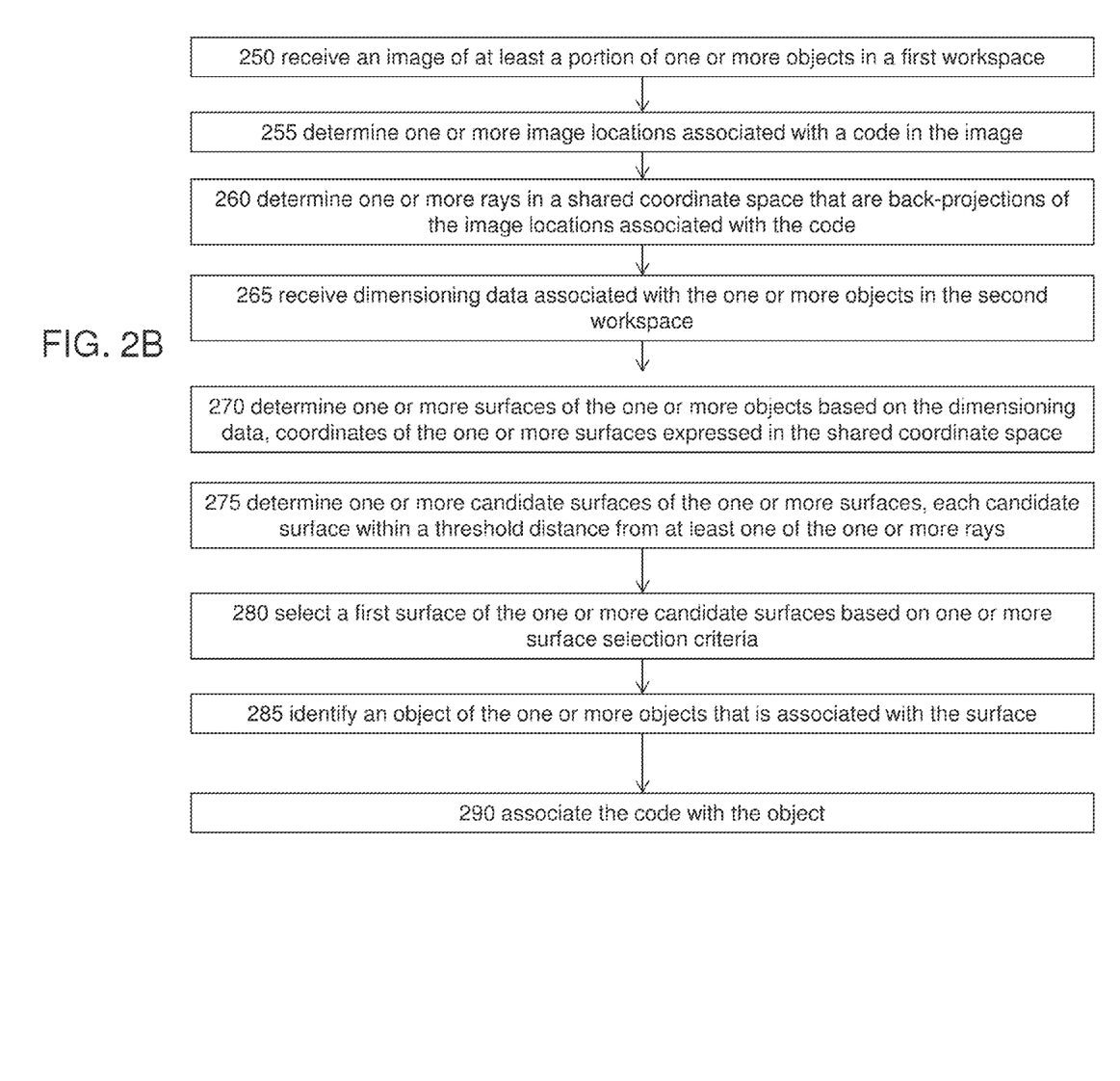
FIG. 2B is a flow chart depicting a machine vision process for associating a code with an object in accordance with the technology.

FIG. 2B is a flow chart depicting a machine vision process for associating a code with an object in accordance with the technology. At step 250, the machine vision processor receives an image of at least a portion of one or more objects in a first workspace. At step 255, the machine vision processor determines one or more image locations associated with a code in the image. For example, the machine vision processor can determine the coordinates in the image coordinate space of a center of the code. In some embodiments, the machine vision processor can determine the coordinates in the image coordinate space of one or more corners of the code. In some embodiments, the machine vision processor can determine the coordinates of sample points in the image coordinate space corresponding to the code. At step 260, the machine vision processor determines one or more rays in a shared coordinate space that are back-projections of the image locations associated with the code. In some embodiments, a single ray can be computed for image locations associated with the code. In some embodiments, multiple rays (e.g., a cone of rays) can be computed for image locations associated with the code. At step 265, the machine vision processor receives dimensioning data associated with the one or more objects in the second workspace. At step 270, the machine vision system can determine one or more surfaces of the one or more objects based on the dimensioning data, the one or more surfaces in the shared coordinate space.

At step 275, the machine vision processor determines one or more candidate surfaces of the one or more surfaces, each candidate surface within a threshold distance from at least one of the one or more rays. For example, the machine vision processor can determine that each surface of the one or more surfaces that is within a threshold distance from a ray of the one or more rays is a candidate surface. The distance between a ray and a surface can be the shortest distance between a point on the ray and a point on the surface. The threshold distance can be determined, in part, based on the size of the objects and the accuracy and/or tolerances of the machine vision system.

At step 280, the machine vision system selects a first surface of the one or more candidate surfaces based on one or more surface selection criteria. For example, each surface of the candidate surfaces can be evaluated using the one or more selection criteria. The candidate surface which evaluates best (e.g., highest score, or lowest residual error) under the selection criteria can be selected as the first surface. Selection criteria can include, average distance (or square distance) between the surface and the one or more rays, whether the surface is associated with an object of dimensions approximately matching the expected object dimensions based on the code (e.g., as in a shipping logistics context where the code is associated with expected package dimensions), etc. More generally, the selection criteria can be probability and/or confidence based and can be a function of known errors, known object pose uncertainty, and possible confusion when the code is near a surface edge, etc. At step 285, the machine vision process identifies an object of the one or more objects that is associated with the first surface. At step 290, the machine vision processor associates the code with the object.

In some embodiments, the above described machine vision processing can be distributed across multiple machine vision processors. For example, machine vision processing can be performed by one or more machine vision processors embedded in a camera, one or more machine vision processors embedded in a dimensioner, one or more standalone machine vision processors, and/or any combination thereof. In one embodiment, for example, camera 115 (or one or more embedded machine vision processors therein) can perform step 210 through step 215 and dimensioner 120 (or one or more embedded machine vision processors therein) can receive the location of the code in the image and perform step 220 through step 245.

III. Calibration

Figure 4:
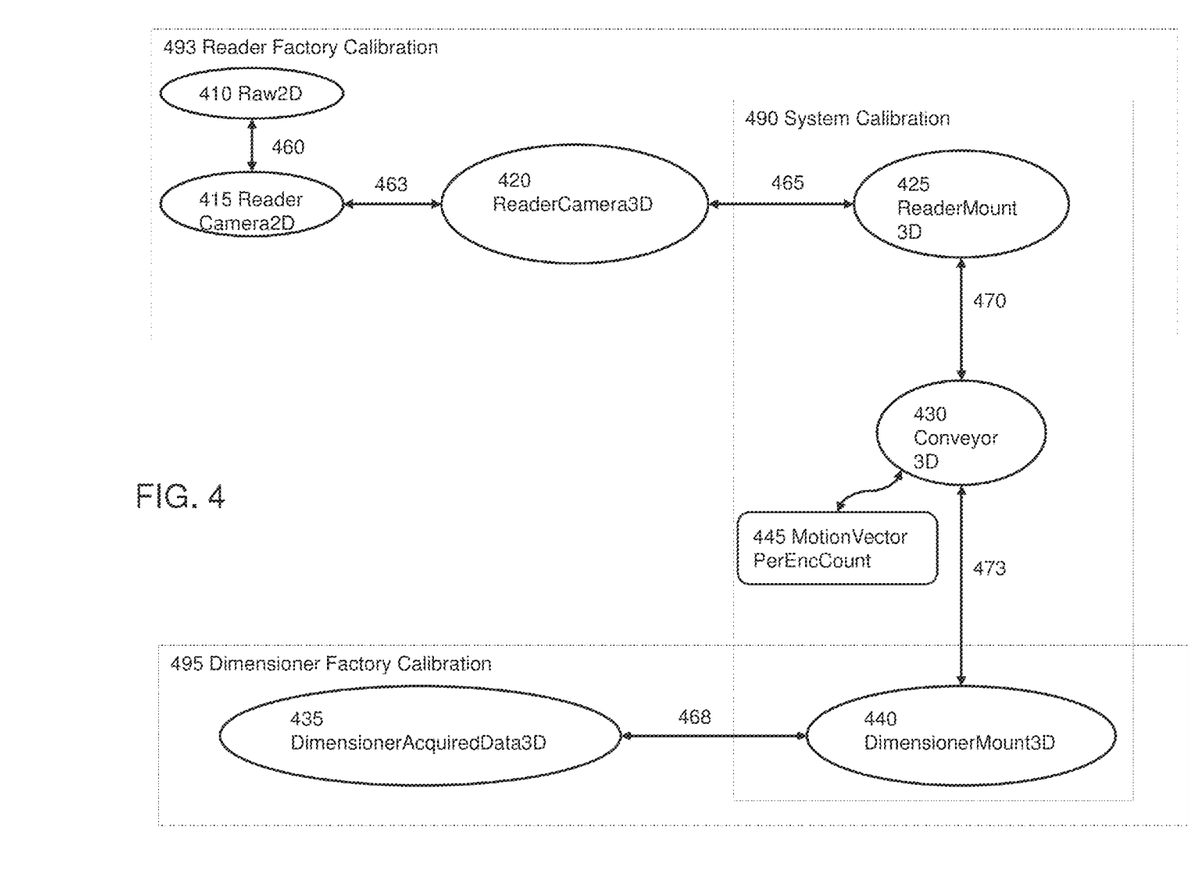
FIG. 4 depicts a calibration scheme in accordance with the technology.

As described above, the technology can include calibration of machine vision systems. FIG. 4 depicts a calibration scheme in accordance with the technology. In FIG. 4, ovals represent coordinate spaces. FIG. 4 includes Raw2D coordinate space 410, ReaderCamera2D coordinate space 415, ReaderCamera3D coordinate space 420, ReaderMount3D coordinate space 425, Conveyor3D coordinate space 430, DimensionerAcquiredData3D coordinate space 435, and DimensionerMount3D coordinate space 440. Arrows between ovals represent transforms between the illustrated coordinate spaces. The transforms are determined by machine vision system configuration and/or one or more calibrations, as described with respect to the illustrative calibration methods below.

A. Reader Camera Calibration

In some embodiments, the technology can include area-scan camera calibration. Raw2D coordinate space 410 can be the coordinate space of raw images (e.g., images directly from the camera's sensor) captured by an area-scan camera (e.g., camera 115). Transform 460 can be a transformation that accounts for and/or corrects for camera intrinsics (e.g., distortion caused by the camera lens, sensor position, etc.). Transform 460 can transform coordinates in Raw2D coordinate space 410 to ReaderCamera2D coordinate space 415 (e.g., an undistorted image coordinate space corrected for lens distortion, sensor aspect ratio, sensor offset, sensor skew, etc.). For example, with respect to FIG. 3, ReaderCamera2D coordinate space 415 can be camera 2D coordinate space 315. Transform 463 can transform coordinates in ReaderCamera2D coordinate space 415 to ReaderCamera3D coordinate space 420. ReaderCamera3D coordinate space 420 can be, for example, the projection of ReaderCamera2D coordinate space 415 to three-dimensional space. In the illustrated embodiment, two dimensional points in ReaderCamera2D coordinate space 415 are mapped to three dimensional rays in ReaderCamera3D coordinate space 420. For the inverse mapping, three dimensional points in ReaderCamera3D coordinate space 420 are mapped to two dimensional points in ReaderCamera2D coordinate space 415. In some embodiments, ReaderCamera3D coordinate space 420 can be a coordinate space in which the origin is the camera/lens optical convergence point; positive X and positive Y axes are approximately parallel to and oriented in the same direction as Raw2D coordinate space 410 X and Y axes; and positive Z axis is the cross product of the positive X and Y axes (e.g., in the direction away from the camera).

Transforms 460 and 463 can be calculated using techniques known in the art, such as those described in "A flexible new technique for camera calibration", IEEE Transactions on Pattern Analysis and Machine Intelligence, 22(11):1330-1334, 2000, the entire contents of which are hereby incorporated by reference. Such calibration functionality is commercially available in such products as Cognex Corporation's VisionPro product.

ReaderMount3D coordinate space 425 can be a coordinate system describing the mounting apparatus/features of a reader camera (e.g., the point and orientation at which camera 115 is mounted in machine vision system 100). Transform 465 (from ReaderCamera3D coordinate space 420 to ReaderMount3D coordinate space 425, or ReaderMount3DFromReaderCamera3D) can be computed, for example, by mounting the reader camera on a robot in a manner such that the relative offset and rotation between the robot end effector and the ReaderMount3D coordinate space 425 are known and then performing a hand-eye calibration to compute the mapping between the robot end-effector and the ReaderCamera3D coordinate space. Such calibration functionality is commercially available in such products as Cognex Corporation's CVL® software.

B. Dimensioner Calibration

In some embodiments, the technology can include dimensioner calibration. DimensionerAcquiredData3D coordinate space 435 can be the internal three-dimensional coordinate space of a dimensioner (e.g., dimensioner 120), in which the dimensioner measures objects. For example, with respect to FIG. 3, DimensionerAcquiredData3D coordinate space 435 can be the coordinate space of dimensioner 120. In some embodiments, a dimensioner can generate a point cloud representing a plurality of points (e.g., on an object) the dimensioner measured. The point cloud can include a plurality of points, with each point's coordinates expressed in DimensionerAcquiredData3D coordinate space 435. Transform 468 can map from DimensionerAcquiredData3D coordinate space 435 to DimensionerMount3D coordinate space 440.

C. System Calibration

In some embodiments, the technology can include machine vision system calibration. In the embodiment illustrated in FIG. 4, system calibration can include determining transform 470, which maps from ReaderMount3D coordinate space 425 to Conveyor3D coordinate space 430. System calibration can include determining transform 473, which maps from DimensionerMount3D coordinate space 440 to Conveyor3D coordinate space 430. Conveyor3D coordinate space 430 can be a coordinate space fixed with respect to DimensionerMount3D coordinate space 440 and ReaderMount3D coordinate space 425. For example, with respect to machine vision system 100, Conveyor3D coordinate space 430 can be fixed with respect to conveyor system 105 (e.g., Conveyor3D coordinate space 430 does not move with conveyor belt 107). With respect to FIG. 3, Conveyor3D coordinate space 430 can be shared coordinate space 305.

In an exemplary system calibration method, a calibration target can be used. The calibration target can be a cuboid. The calibration target is of known dimensions (e.g., height, length, and width). Each surface of the calibration target includes a planar calibration pattern, such as a checkerboard with checkers of known size, a fiducial at the center of the surface, and a barcode indicating which of the calibration target's surfaces the surface is, e.g., Front, Back, Left, Right, Top, Bottom. A SystemCalibTarget3D coordinate space can be defined as a coordinate space in which: the origin is a center point of the Bottom surface of calibration target; the Z=0 plane is the Bottom surface of the calibration target; the positive Z axis is in the direction to the Top surface; the positive Y axis is in the direction to the Front surface; and the positive X axis is the cross product of the positive Z and positive Y axes.

For the illustrative calibration target, the transforms between the coordinate space of each surface of the calibration target and the SystemCalibTarget3D coordinate space are known (e.g., the calibration target is precisely manufactured such that the relationships between all surfaces are known). The transforms are the following:

SystemCalibTarget3DFromFront3D (e.g., Front to SystemCalibTarget3D);

SystemCalibTarget3DFromBack3D (e.g., Back to SystemCalibTarget3D);

SystemCalibTarget3DFromLeft3D (e.g., Left to SystemCalibTarget3D);

SystemCalibTarget3DFromRight3D (e.g., Right to SystemCalibTarget3D);

SystemCalibTarget3DFromTop3D (e.g., Top to SystemCalibTarget3D); and

SystemCalibTarget3DFromBottom3D (e.g., the identity transform).

1. System Calibration Data Acquisition

The calibration methods can include placing the calibration target described above on the conveyor belt of a conveyor system (e.g., conveyor belt 107 of conveyor system 105) such that the calibration target is upstream of the dimensioner and reader camera, with the Bottom surface of the calibration target coincident with the top surface of the conveyor belt and is centered across the conveyor belt with the Left and Right surfaces parallel to the conveyor motion direction (e.g., arrow 135). The conveyor belt can convey the calibration target past the dimensioner. When a first portion of the calibration target (e.g., a leading edge) is acquired (e.g., measured) by the dimensioner, the dimensioner can record the encoder count as EncoderCountStart. When a last portion of the calibration target is acquired by the dimensioner, the dimensioner can record the encoder count as EncoderCountEnd. The dimensioner can compute the three-dimensional surface data of the calibration target (e.g., the coordinates of the surfaces of the calibration target) in DimensionerMount3D coordinate space 440 when the encoder count was EncoderCountEnd.

The conveyor belt can convey the calibration target past the reader camera. When the reader camera reads a code identifying one of the surfaces of the calibration target, the reader camera can record the encoder count as EncoderCountCodeRead and the reader camera can store the acquired image.

2. System Calibration Calculation

After acquiring the data described above, the illustrative calibration methods can include calculating transform 473 (DimensionerMount3D coordinate space 440 to Conveyor3D coordinate space 430) and transform 470 (ReaderMount3D coordinate space 425 to Conveyor3D coordinate space 430). MotionVectorPerEncCountConveyor3D 445 can be defined to describe the motion of the conveyor belt with respect to the encoder count (e.g., representing the encoder pulse count distance). In the illustrative calibration methods, MotionVectorPerEncCountConveyor3D 445 is the 3D vector in Conveyor3D coordinate space 430 representing the direction and distance a conveyor belt moves in 1 encoder count. If it is assumed that the conveyor belt motion direction is along the positive Y direction of Conveyor3D coordinate space 430, MotionVectorPerEncCountConveyor3D 445 can be the matrix:

$$\begin{bmatrix} 0 \\ \frac{\text{Distance between calibration target Front and Back}}{\text{EncoderCountEnd} - \text{EncoderCountStart}} \\ 0 \end{bmatrix}$$

In some embodiments, multiple acquisitions from reader cameras and the associated encoder counts can be used to determine the MotionVectorPerEncCountConveyor3D or refine the system calibration information in cases where the calibration target Left/Right surfaces are not accurately aligned with the motion direction.

a. Dimensioner

Determining transform 473 (DimensionerMount3D coordinate space 440 to Conveyor3D coordinate space 430) can include determining a transform from SystemCalibTarget3D coordinate space to DimensionerMount3D coordinate space 440. This transform (DimensionerMount3DFromSystemCalibTarget3D) is the pose of the 3D System Calibration Target in DimensionerMount3D space. DimensionerMount3DFromSystemCalibTarget3D can be computed by the dimensioner by an alignment operation that aligns the 3D surface data in DimensionerMount3D coordinate space 440 produced by the dimensioner with the simple 3D cuboid model of the calibration target. Transform 473 (DimensionerMount3D coordinate space 440 to Conveyor3D coordinate space 430, or Conveyor3DFromDimensionerMount3D) can be calculated using the following equation:

Conveyor3DFromDimensionerMount3D=Conveyor3DFromSystemCalibTarget3D*DimensionerMount3DFromSystemCalibTarget3D$^{-1}$.

Where:
Conveyor3DFromSystemCalibTarget3D is the pose of the calibration target in Conveyor3D coordinate space 430.

b. Reader Camera

Determining transform 470 (ReaderMount3D coordinate space 425 to Conveyor3D coordinate space 430) can include determining a transform from ReaderCamera3D coordinate space 420 to a coordinate space of a face of the calibration target (e.g., the face read during the System Calibration Data Acquisition described above). In the illustrative example, the Front face will be used, with Front3D coordinate space. The reader camera can compute a transform from the ReaderCamera3D to Front3D coordinate space (Front3DFromReaderCamera3D).
Front3DFromReaderCamera3D can be calculated using conventional 3D pose estimation techniques known by those of skill in the art. Such pose estimation functionality is commercially available in such products as Cognex Corporation's VisionPro product.

Determining transform 470 (ReaderMount3D coordinate space 425 to Conveyor3D coordinate space 430) can include determining a motion vector (FrontWhenDimensioned3DFrom FrontWhenRead3D) describing the motion of the calibration target from EncoderCountEnd to EncoderCountCodeRead.

FrontWhenDimensioned3DFromFrontWhenRead3D can be calculate using the following equation:

FrontWhenDimensioned3DFromFrontWhenRead3D=MotionVectorPerEncCountConveyor3D*(EncoderCountCodeRead−EncoderCountEnd)

Transform 470 (ReaderMount3D coordinate space 425 to Conveyor3D coordinate space 430, or Conveyor3DFromReaderMount3D) can be calculated using the following equation:

Conveyor3DFromReaderMount3D=Conveyor3DFromDimensionerMount3D*DimensionerMount3DFromSystemCalibTarget3D*SystemCalibTarget3DFromFront3D *
FrontWhenDimensioned3DFromFrontWhenRead3D *
Front3DFromReaderCamera3D*ReaderMount3DFromReaderCamera3D$^{-1}$ IV. Calibration Logistics In some embodiments, the technology can include calibration methods that facilitate configuration and maintenance of machine vision systems. As described above, transform 473 (DimensionerMount3D coordinate space 440 to Conveyor3D coordinate space 430) is the mapping from the highly repeatable mounting surface of the dimensioner to the Conveyor3D coordinate space. Beneficially, by using a transform to the highly repeatable mounting surface of the dimensioner, system calibration 490 (e.g., determining transforms 470 and 473) can be done once for the dimensioner position and, when a dimensioner requires replacement, a replacement dimensioner can be mounted in place of the original dimensioner, without the need for a subsequent system calibration 490. For example, in an exemplary implementation, dimensioner factory calibration 495 can be done when the replacement dimensioner is manufactured and provided with the replacement dimensioner (e.g., stored on memory in the dimensioner). Factory calibration 495 can include calculating transform 468. Integrating the replacement dimensioner into the machine vision system does not require further system calibration 490 because the necessary transforms have been computed (e.g., either during dimensioner factory calibration 495 or an earlier system calibration 490).

As described above transform, 470 (ReaderMount3D coordinate space 425 to Conveyor3D coordinate space 430) is the mapping from the highly repeatable mounting surface of a reader camera to the Conveyor3D coordinate space. One of such transforms can be computed for each reader camera in the machine vision system. Beneficially, by using a transform to the highly repeatable mounting surface of a reader camera, system calibration 490 can be done once for each reader camera position and, when a reader camera requires replacement, a replacement reader camera can be mounted in place of the original reader camera, without the need for a subsequent system calibration. For example, in an exemplary implementation, reader camera factory calibration 493 can be done when the replacement reader camera is manufactured and provided with the replacement reader camera (e.g., one or more of transforms 460, 463, and 465 stored on memory in the reader camera). Factory calibration 493 can include calculating transforms 460, 463, and 465. Integrating the replacement reader camera into the machine vision system does not require further system calibration because the necessary transforms have been computed (e.g., either during reader camera factory calibration 493 or an earlier system calibration 490).

The calibration methods described are exemplary. In some embodiments, the above described calibration methods can be distributed across multiple machine vision processors. For example, calibration methods (or portions thereof) can be performed by one or more machine vision processors embedded in a camera, one or more machine vision processors embedded in a dimensioner, one or more standalone machine vision processors, and/or any combination thereof. In some embodiments, the calibration methods (or portions thereof)

can be performed by a machine vision processor that is not part of machine vision system 100. For example, the computed calibration data can be transferred to the machine vision system 100 from an external machine vision processor. While the exemplary calibration methods are described using a cuboid calibration target, it is contemplated that other types and/or shapes of calibration targets can be used. It is contemplated that multiple reader cameras can be calibrated using similar methods. It is contemplated that more than one encoder can be used (e.g., the dimensioner and reader camera can each use a separate encoder generating a separate encoder count). The calibration methods can be used in a system with multiple encoders where encoders are synchronized and/or the relationship between the encoders is known or determinable. The calibration methods can be used irrespective of the order of the dimensioner and reader camera (e.g., whether objects on the conveyor pass the dimensioner or reader camera first). It should be appreciated that other approaches to calibration are contemplated. For example, two or more of the described transforms can be combined into a single transform (e.g., a composition of the transforms). Additional and/or different coordinate spaces can be defined. In some embodiments, the machine vision system 100 is designed and constructed such that the relationship between ReaderMount3D coordinate space 425 and DimensionerMount3D coordinate space 440 and the conveyor system 105 is known. More generally, calibration in accordance with the technology can include the transforms for expressing dimensioner data and a ray (e.g., back-projection of the image location of the code) in a shared coordinate space.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A machine vision system comprising:
    a two dimensional (2D) area-scan camera having a field of view (FOV), the area-scan camera disposed relative to a first workspace such that the FOV covers at least a portion of the first workspace;
    a dimensioner disposed relative to a second workspace;
    one or more machine vision processors in communication with the area-scan camera and the dimensioner, the one or more machine vision processors configured to:
    receive from the area-scan camera an image of at least a portion of one or more objects in the first workspace;
    determine an image location of a code in the image;
    determine a ray in a shared coordinate space that is a back-projection of the image location of the code;
    receive from the dimensioner dimensioning data associated with the one or more objects in the second workspace;
    determine one or more surfaces of the one or more objects based on the dimensioning data, coordinates of the one or more surfaces expressed in the shared coordinate space;
    determine a first surface of the one or more surfaces that intersects the 3D ray;
    identify an object of the one or more objects that is associated with the first surface; and associate the code with the object.

2. The system of claim 1, wherein the first workspace is the same as second workspace.

3. The system of claim 1, wherein the first workspace and the second workspace at least partially intersect.

4. The system of claim 1, wherein the first workspace and the second workspace are disjoint.

5. The system of claim 1, further comprising: a conveyor configured to move the one or more objects through the first workspace and the second workspace.

6. The system of claim 1, wherein the dimensioner is a time-of-flight dimensioner.

7. The system of claim 1, wherein the one or more machine vision processors are further configured to determine the first surface of the one or more surfaces that intersects the 3D ray by determining a proximal surface of one or more intersecting surfaces intersecting the 3D ray that is closest to the area-scan camera.

8. The system of claim 1, wherein the one or more machine vision processors are further configured to:
    determine dimensions of the object based on the dimensioner data; and
    provide the code and the dimensions of the object.

9. The system of claim 1, wherein the area-scan camera comprises a memory storing one or more camera calibration transforms and the one or more machine vision processors are configured to:
    receive the one or more camera calibration transforms from the memory of the area-scan camera; and
    determine one or more system calibration transforms based on the one or more camera calibration transforms.

10. A method performed by one or more machine vision processors comprising:
    receiving, by the one or more machine vision processors, from a two dimensional (2D) area-scan camera an image of at least a portion of one or more objects in a first workspace;
    determining, by the one or more machine vision processors, an image location of a code in the image;
    determining, by the one or more machine vision processors, a ray in a shared coordinate space that is a back-projection of the image location of the code in the image;
    receiving, by the one or more machine vision processors, from a dimensioner dimensioning data associated with the one or more objects in a second workspace;
    determining, by the one or more machine vision processors, one or more surfaces of the one or more objects based on the dimensioning data, the one or more surfaces expressed in the shared coordinate space;
    determining, by the one or more machine vision processors, a first surface of the one or more surfaces that intersects the 3D ray;
    identifying, by the one or more machine vision processors, an object of the one or more objects that is associated with the first surface; and
    associating, by the one or more machine vision processors, the code with the object.

11. The method of claim 10, wherein the first workspace is the same as second workspace.

12. The method of claim 10, wherein the first workspace and the second workspace at least partially intersect.

13. The method of claim 10, wherein the first workspace and the second workspace are disjoint.

14. The method of claim 10, wherein determining the first surface of the one or more surfaces that intersects the 3D ray comprises determining a proximal surface of one or more intersecting surfaces intersecting the 3D ray that is closest to the area-scan camera.

15. The method of claim 10, further comprising:
    determining, by the one or more machine vision processors, dimensions of the object based on the dimensioner data; and
    providing, by one or more machine vision processors, the code and the dimensions of the object.

16. The method of claim 10, wherein the area-scan camera comprises a memory storing one or more camera calibration transforms and the method further comprises:
    receiving, by the one or more machine vision processors, the one or more camera calibration transforms from the memory of the area-scan camera; and
    determining, by the one or more machine vision processors, one or more system calibration transforms based on the one or more camera calibration transforms.

17. A computer program product, tangibly embodied in a non-transitory computer readable storage medium, comprising instructions being operable to cause one or more machine vision processors to:
    receive from a two dimensional (2D) area-scan camera an image of at least a portion of one or more objects in a first workspace;

determine an image location of a code in the image;
determine a ray in a shared coordinate space that is a back-projection of the image location of the code in the image;
receive from a dimensioner dimensioning data associated with the one or more objects in a second workspace;
determine one or more surfaces of the one or more objects based on the dimensioning data, the one or more surfaces expressed in the shared coordinate space; determine a first surface of the one or more surfaces that intersects the 3D ray;
identify an object of the one or more objects that is associated with the first surface; and
associate the code with the object.

18. The computer program product of claim 17, wherein the first workspace is the same as second workspace.

19. The computer program product of claim 17, wherein the first workspace and the second workspace at least partially intersect.

20. The computer program product of claim 17, wherein the first workspace and the second workspace are disjoint.

21. The computer program product of claim 17, wherein the instructions being operable to cause the one or more machine vision processors to determine the first surface of the one or more surfaces that intersects the 3D ray comprise instructions to:
determine a proximal surface of one or more intersecting surfaces intersecting the 3D ray that is closest to the area-scan camera.

22. The computer program product of claim 17, further comprising instructions being operable to cause the one or more machine vision processors to:
determine dimensions of the object based on the dimensioner data; and
provide the code and the dimensions of the object.

23. The computer program product of claim 17, wherein the area-scan camera comprises a memory storing one or more camera calibration transforms and the computer program product further comprising instructions being operable to cause the one or more machine vision processors to:
receive the one or more camera calibration transforms from the memory of the area-scan camera; and
determine one or more system calibration transforms based on the one or more camera calibration transforms.

24. A machine vision system comprising:
a two dimensional (2D) area-scan camera having a field of view (FOV), the area-scan camera disposed relative to a first workspace such that the FOV covers at least a portion of the first workspace;
a dimensioner disposed relative to a second workspace;
one or more machine vision processors in communication with the area-scan camera and the dimensioner, the one or more machine vision processors configured to:
receive from the area-scan camera an image of at least a portion of one or more objects in the first workspace;
determine one or more image locations associated with a code in the image;
determine one or more rays in a shared coordinate space that are back-projections of the one or more image locations associated with the code;
receive from the dimensioner dimensioning data associated with the one or more objects in the second workspace;
determine one or more surfaces of the one or more objects based on the dimensioning data, coordinates of the one or more surfaces expressed in the shared coordinate space;
determine one or more candidate surfaces of the one or more surfaces, wherein each candidate surface is within a threshold distance from at least one of the one or more rays;
select a first surface of the one or more candidate surfaces based on one or more surface selection criteria;
identify an object of the one or more objects that is associated with the first surface; and
associate the code with the object.

* * * * *